United States Patent [19]

Singleton et al.

[11] 3,966,876

[45] June 29, 1976

[54] GAS PURIFICATION

[75] Inventors: Frank Henry Singleton, Croydon; Derek Vernon Gosden; Graham Woodhouse, both of Horsham, all of England

[73] Assignee: Woodall-Duckham, Limited, England

[22] Filed: Dec. 18, 1973

[21] Appl. No.: 425,715

[52] U.S. Cl................................ 423/233; 423/236; 423/571; 423/573 G
[51] Int. Cl.².......................................... C01B 17/04
[58] Field of Search ........... 423/567, 571, 573, 232, 423/233, 256

[56] References Cited
UNITED STATES PATENTS

| | | | |
|---|---|---|---|
| 1,542,971 | 6/1925 | Sperr et al. | 423/232 |
| 1,653,933 | 12/1927 | Sperr et al. | 423/428 |
| 1,852,160 | 4/1932 | Hansen | 423/573 X |
| 1,932,819 | 10/1933 | Hansen | 423/546 |
| 1,961,255 | 6/1934 | Sperr | 423/233 |
| 3,086,838 | 4/1963 | Giammarco | 423/232 X |
| 3,558,272 | 1/1971 | Urban | 423/571 |
| 3,878,289 | 4/1975 | Beavon | 423/236 X |
| 3,887,682 | 6/1975 | Kumata et al. | 423/236 |

FOREIGN PATENTS OR APPLICATIONS

| | | | |
|---|---|---|---|
| 377,667 | 1/1931 | United Kingdom | 423/236 |

*Primary Examiner*—G. O. Peters
*Attorney, Agent, or Firm*—Watson, Cole, Grindle & Watson

[57] ABSTRACT

Gas purification processes for removing hydrogen sulphide ($H_2S$) from a foul gas stream, such as coal carbonization gases, involving a circulating liquid reagent in which the $H_2S$ is absorbed and converted to sulphur which is recovered and the reagent regenerated and recycled exhibit progressive deterioration of the circulating reagent due to contamination by process by-products. The invention provides a method of decontaminating such a circulating reagent by subjecting a bled-off sidestream to high temperature hydrolysis, so producing gaseous products recyclable to the foul gas stream. Solid products may also be produced which may be recycled to the reagent, perhaps after high-temperature reduction.

2 Claims, 1 Drawing Figure

U.S. Patent    June 29, 1976    3,966,876
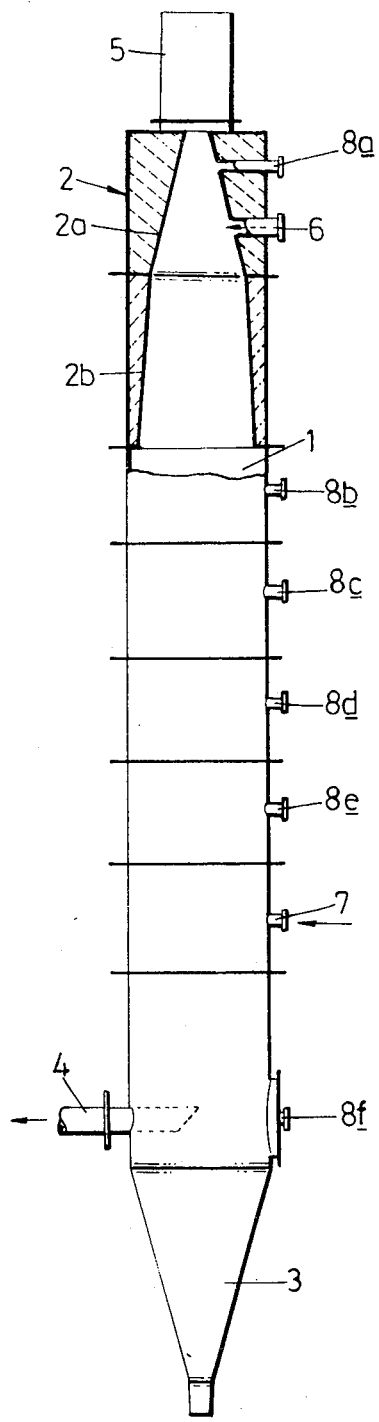

GAS PURIFICATION

FIELD OF THE INVENTION

This invention concerns gas purification by the removal of hydrogen sulphide ($H_2S$) from a foul gas by processes of the type in which the $H_2S$ in a foul gas stream is absorbed by a liquid reagent and thereby converted to sulphur which is recovered from the reagent, the latter being regenerated and recycled for absorption of further $H_2S$.

BACKGROUND OF THE INVENTION

Several processes of the above general type are now well established in the art of gas purification with wide utility in the removal of $H_2S$ from foul gas streams of various compositions and origins. The liquid reagent used differs in composition from process to process and application to application: in, for instance, the Stretford Process the liquid reagent is fundamentally an alkaline solution of one or more of the anthraquinone disulphonic acid (ADA) salts and contains also vanadium. The foul gas stream is brought into contact with this reagent, the alkali of which reacts with the $H_2S$ in the gas to form the hydrosulphide which thereupon reacts both with the ADA and pentavalent vanadium, reducing the ADA to the hydroquinone form and the vanadium to the tetravalent state whilst liberating sulphur. The reagent is regenerated by blowing air through it, thereby floating the sulphur as a froth for removal and recovery and oxidising the reduced reagent materials back to their original respective form and state.

In the similar Takahax Process the liquid reagent is a solution of the sodium salt of napthaquinone disulphonic acid: a variant of this latter process is the Perox Process in which the liquid reagent is a solution of the ammonium salt of naphthaquinone disulphonic acid.

In practical operation of such processes, thiosulphate is formed as an unwanted by-product, as a result of oxidation of an initially-formed hydrosulphide. This oxidation may occur as a result of the presence of oxygen in the foul gas stream entering the reagent in the absorption stage or as a result of carry-over of unreacted hydrosulphide into the regeneration stage. In either event, the build-up of thiosulphate in the circulating reagent must be restricted. Similarly, sulphate tends to be formed in the reagent as an unwanted contaminant.

When, as is sometimes the case, the foul gas stream contains traces of HCN — for instance when the foul gas is a coal carbonisation by-product — this tends also to be absorbed by the circulating reagent and to appear as thiocyanate therein.

In conventional practice of these processes, the build-up of these unwanted contaminants in the circulating reagent is controlled by bleeding-off a small sidestream of spent reagent. There then arises the problem of disposal of the spent reagent, a problem that is especially acute when the contaminants include thiocyanate.

THE INVENTION

We have found that the typical contaminants that tend to build-up in the circulating liquid reagent of such processes as the Stretford Process may be economically removed from the circulating reagent in a manner which avoids the production of a noxious effluent and which gives rise to recovery of at least part of the sulphur content of the removed contaminants. A method for the decontamination of the circulating reagent in a gas purification process of the aforesaid type comprises, in accordance with the invention, bleeding-off a sidestream of contaminated reagent and subjecting the same to high-temperature hydrolysis in a non-oxidising atmosphere, thereby to produce a gas phase containing $H_2S$, and recycling said gas phase to the foul gas stream being subjected to purification by the process.

Depending upon the composition of the liquid reagent and of the foul gas being subjected to purification by the process, a solids residue containing various materials deriving from the process reagent and from the individual contaminants of the reagent may be produced in the said hydrolysis. Predominantly however, such solids will be sulphate deriving both from the thiosulphate contaminant and from the sulphate contaminant of the reagent; in the case of the Stretford Process there will also be vanadate from the vanadium of the reagent. If the reagent contaminants include thiocyanate this will be decomposed and the solids residue will include carbonate derived therefrom.

Such a solids residue may in some cases be recovered and disposed of as such. However, often the residue will contain sulphide which makes disposal difficult: alternatively, therefore, a solids residue may be subjected to high-temperature reduction which will convert the sulphate of the residue into sulphide, which may be returned to the circulating process reagent stream.

The hydrolysis step may be conducted in a suitable spray-roaster or equivalent device, the non-oxidising atmosphere conveniently being the product of stoichiometric or, preferably, sub-stoichiometric (oxygen-lean) combustion of a fuel/air mixture which provides the heat required for the hydrolysis reaction. In such case, the reaction may occur within a retention period of a few seconds, e.g. 5–15 seconds, at a temperature in the approximate range 500°–800°C. The preferred apparatus for conducting the hydrolysis, especially in the case of a liquid reagent which decomposes under the hydrolysis conditions to sodium salts, particles of which tend to adhere to each other and to reactor walls at the reaction temperatures involved, is a co-current reactor in which hot combustion products carry droplets of the bled-off sidestream of liquid reagent towards gas and solids outlets, a coolant such as water being sprayed into the reactor at a suitable point to cool the solids product to a suitably low temperature for preventing adhesion between the solid particles and reactor surfaces.

In the case of the Stretford Process, the ADA in the bled-off sidestream decomposes in the hydrolysis step, forming CO, $CO_2$, $Na_2SO_4$ and, in some cases, $Na_2S$: in other processes of the said type the reagent will generally be similarly decomposed, it being noted that in a process such as the Perox Process in which ammonium salts constitute the reagent, the hydrolysis results in gaseous products only.

Complete reduction of any solids residue produced by the hydrolysis step may be accomplished at a temperature of about 500°–800°C. and may be performed, for instance, in a rotary kiln, using coke-oven gas as reductant.

When the method of the invention is applied to the purification of a foul gas which initially contains HCN — for instance coke-oven gas — the bulk of which is removed from the foul gas stream by polysulphide washing upstream of the gas purification process under consideration, the method may conveniently be integrated with the method of the copending application Ser. No. 425,948 of Singleton and Gosden filed concurrently herewith for decontamination of the circulating polysulphide wash liquor. The method of that copending Application involves the hydrolysis of bled-off polysulphide wash liquor to convert thiocyanate therein to products which include gaseous $H_2S$ which is recycled back to the foul gas stream. When ammonium polysulphide washing is used for the HCN removal, the hydrolysis step of the method of the said copending Application may be conducted alongside and in combination with the hydrolysis step of the method of the present invention: that is the bled-off ammonium polysulphide wash liquor may be combined with the bled-off sidestream of reagent and the combined bleeds subjected to hydrolysis as above described.

The principal reactions that occur in the method of the present invention may be summarised as follows, assuming that the gas purification process is the Stretford Process which is operating with a reagent comprising ADA, $Na_2CO_3$ and $NaVO_3$.

Hydrolysis

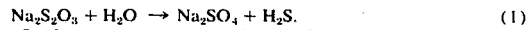

$$Na_2S_2O_3 + H_2O \rightarrow Na_2SO_4 + H_2S. \qquad (1)$$

If the foul gas stream contains: HCN, the contaminants of the reagent will include NaCNS which is mainly hydrolysed as follows:

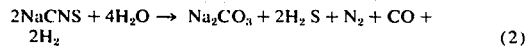

$$2NaCNS + 4H_2O \rightarrow Na_2CO_3 + 2H_2S + N_2 + CO + 2H_2 \qquad (2)$$

If the gas phase of the reaction mixture in the hydrolysis step contains a sufficient amount of $H_2S$, some of the thiocyanate will be converted to sulphide instead of carbonate as indicated by reaction (2). Sulphate as $Na_2SO_4$ contaminant in the reagent will be mainly unchanged by the hydrolysis step and appear unchanged in the solids residue.

Reduction

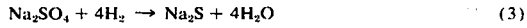

$$Na_2SO_4 + 4H_2 \rightarrow Na_2S + 4H_2O \qquad (3)$$

It will be seen that by recycling the gas phase products of reaction (1) above to the foul gas stream, the $H_2S$ content of the latter entering the Stretford Process plant will be increased, usually only to a small extent — perhaps 2% — and there will be additional recovery of sulphur by that plant. If reaction (2) occurs, the gaseous products of that reaction other than $H_2S$ may usually be added to the foul gas stream without significant effect upon the composition or characteristics of the ultimate product gas.

In the case of a Stretford Process purification of a coal carbonisation gas, for instance coke-oven gas, the foul gas stream fed to the Stretford Process Plant will ordinarily have previously been subjected to primary cooling followed by tar removal, light oil removal and HCN removal. It will usually in such cases be convenient to recycle the gaseous products of the hydrolysis reaction(s) to the foul gas upstream of the primary cooler.

If the hydrolysis step is carried out in a reducing atmosphere — for instance in the products of substoichiometric combustion — some reduction of thiosulphate, sulphate and of any thiocyanate will take place, giving rise to sodium sulphide in the solids product of the hydrolysis. The presence of sulphide so produced is an embarrassment to disposal of the product solids, so that in practice it will usually be desirable to perform the high-temperature reduction step upon the solids, thereby converting these to residue which may all be recycled to the liquid reagent.

The method of the invention may be carried out on a continuous basis or upon an intermittent basis. Preferably however the hydrolysis step is carried out continuously upon a bled-off continuous sidestream of the reagent, whilst any high-temperature reduction of the solids residue of the hydrolysis step may be performed on intermittent basis.

THE DRAWING

The hydrolysis step is most conveniently carried out continuously in a co-current reactor of the construction shown in the accompanying drawing which is a schematic axial section of the reactor.

Thus the drawing shows a reactor which for most of its length is cylindrical, comprising a steel tubular body 1 disposed vertically below a refractory inlet section 2 which is of divergent internal form, its bore being in two frustoconical sections 2a, 2b. At its lower end, the body 1 joins a tapering solids outlet section 3 and has a lateral gas outlet 4.

In an embodiment of the illustrated reactor the body had an internal diameter of 33 inches and a length of 180 inches, the inlet section 2 having an upper part of length 36 inches and a lower part of length 42 inches. The outlet section had a length of 54 inches.

At its upper end, the inlet section 2 is connected to a suitable combustion chamber 5 within which fuel (oil or gas) is burnt with air, preferably in an amount such as to result in sub-stoichiometric combustion and the production of reducing gaseous combustion products which enter the inlet section and travel down the reactor to escape through the gas outlet 4.

A liquor inlet 6 is provided in the inlet section 2, for directing a spray of liquor for hydrolysis into the flow of gaseous products from the combustion chamber 5. Droplets of liquor travel with the gaseous products down through the reactor, reacting to produce a solids residue which mainly collects in the outlet section 3 from which it is removed at suitable intervals through a dump valve (not shown).

Since the solids residue is of fine particle form, some will be carried out of the reactor with the gases through the gas outlet 4. The latter accordingly connects to suitable separators, such as a cyclone separator (not shown) for removing the solids from the gases.

At a point near its lower end the body 1 is fitted with a lateral inlet 7 for coolant. In the illustrated case, the inlet 7 is about 48 inches above the level of the centreline of the gas outlet 4: the coolant is usually water.

The drawing illustrates an instrumented experimental reactor having ports 8a, 8b and so on at various levels and fitted with thermocouples for sensing the interior temperature at their respective levels. Corresponding thermocouples are fitted to the shell of the reactor at the same levels and in a typical experimental run with this reactor the following temperatures were recorded at the levels indicated.

| Port | Level | Temperature °C | |
|---|---|---|---|
| | | Internal | Shell |
| 8a | 237 | 1275 | — |
| 8b | 156 | 750 | 610 |
| 8c | 132 | 720 | 625 |
| 8d | 102 | 700 | 615 |
| 8e | 78 | 680 | 575 |
| — | 48 | — | 510 |
| 8f | 0 | 320 | — |

In the above Table, 'Level' is the height, in inches, of the measurement point above the centreline of the gas outlet 4.

We claim:

1. In a gas purification process in which $H_2S$ in a foul gas stream is absorbed by a liquid reagent, said liquid reagent gradually becoming contaminated predominantly with at least one member selected from a group consisting of thiosulphate, sulphate and thiocyanate, the improvement in which comprises controlling the build up of said contaminants in the liquid reagent without directly disposing of the contaminated spent liquid reagent by bleeding off a side stream of said contaminated, spent liquid reagent, subjecting said side stream to high-temperature hydrolysis in a non-oxidizing atmosphere at a temperature in the range of 500° to 800°C, thereby producing a gas phase containing $H_2S$ and a solid phase, recycling said gas phase containing $H_2S$ to the foul gas stream being subjected to purification by the said process, and subjecting the solid phase to reduction by contact with a reducing gas at a temperature in the range of 500° by 800°C.

2. The process of claim 1, wherein the solid phase is selected from a group consisting of at least one of sulphate and thiosulphate, whereby the solid phase is reduced to sulphide, and wherein the additional step of recycling the sulphide to the liquid reagent is performed.

* * * * *